United States Patent [19]
Guenther et al.

[11] Patent Number: 6,119,052
[45] Date of Patent: Sep. 12, 2000

[54] MARKET-BASED CONTROL SYSTEM FOR CONTROLLING OBJECT MOTION WITH SMART MATTER

[75] Inventors: Oliver Guenther; Tad H. Hogg, both of Mountain View; Bernardo A. Huberman, Palo Alto; Andrew A. Berlin, San Jose, all of Calif.

[73] Assignee: Xerox Corporation, Stamford, Conn.

[21] Appl. No.: 09/033,221

[22] Filed: Mar. 2, 1998

[51] Int. Cl.[7] .................................................. G06F 7/00
[52] U.S. Cl. .................... 700/228; 700/229; 700/230; 700/112; 700/115; 700/116; 705/22; 705/23; 705/37; 271/194; 271/195; 271/225
[58] Field of Search ................................... 700/2, 90, 91, 700/92, 112, 113, 114, 115, 116, 117, 213, 214, 215, 219, 228–230; 705/22, 23, 37; 271/194, 195, 196, 197, 225–227

[56] References Cited

U.S. PATENT DOCUMENTS

| | | | |
|---|---|---|---|
| 5,060,090 | 10/1991 | Kobayashi et al. | 360/71 |
| 5,394,324 | 2/1995 | Clearwater | 364/402 |
| 5,398,462 | 3/1995 | Berlin et al. | 52/1 |
| 5,469,150 | 11/1995 | Sitte | 340/825.07 |
| 5,634,636 | 6/1997 | Jackson et al. | 271/225 |
| 5,640,569 | 6/1997 | Miller et al. | 395/729 |
| 5,774,877 | 6/1998 | Patterson, Jr. et al. | 705/35 |
| 5,793,301 | 8/1998 | Patterson, Jr. et al. | 340/825.26 |
| 5,797,002 | 8/1998 | Patterson, Jr. et al. | 707/100 |
| 5,845,265 | 12/1998 | Woolston | 705/37 |
| 5,915,245 | 6/1999 | Patterson, Jr. et al. | 705/35 |

OTHER PUBLICATIONS

Oliver Guenther, Tad Hogg and Bernardo Huberman, "Controls for Unstable Structures," published in SPIE Proceedings vol. 3039, pp. 754–763, Jun. 1997 (ISBN: 0–8194–2452–8) and presented at Proc. of the SPIE conference on Mathematics and Control in Smart Structures Mar. 3–6, 1997 (also available on the internet at http://www.parc.xerox.com/spl/groups/dynamics/www/smart-spie.html).

Oliver Guenther, Tad Hogg and Bernardo Huberman, "Market Organizations for Controlling Smart Matter," published in "Simulating Social Phenomena," editor Conte et al., pp. 241–257, Sep., 1997 (also available on the internet at http://www.parc.xerox.com/spl/groups/dynamics/www/beamorg.html).

Oliver Guenther, Tad Hogg and Bernardo A. Huberman, "Power Markets for Controlling Smart Matter," Los Alamos preprint available on the Web at http://xxx.lanl.gov/abs/cond–mat/9703078, Mar. 7, 1997.

Bernardo Huberman and Scott H. Clearwater, "A Multi-Agent System For Controlling Building Environments" in the publication by V. Lesser (editor), Proc. Of the 1st International Conference On Multiagent Systems (ICMAS95), pp. 171–176, 1995.

James F. Kurose and Rahaul Simha, "A Microeconomic Approach To Optimal Resource Allocation In Distributed Computer Systems," IEEE Transactions On Computers, vol. 38, No. 5, pp. 705–717, May 1989.

(List continued on next page.)

*Primary Examiner*—Paul P. Gordon
*Assistant Examiner*—Ramesh Patel

[57] ABSTRACT

A market based controller controls the motion of an object on a transport assembly. The transport assembly is formed using sensors and actuators that are proximately coupled in physical space. To efficiently allocate a fixed amount of air pressure directed to the actuators, the market controller maps each market agent to points in space on the transport assembly, as well as, points in time relative to a system clock. Using information gathered from the sensor units, each market agent determines whether to bid on the fixed amount of air pressure each bid interval. Using the bids submitted by the market agents, a market equilibrium price and quantity are computed by a market auctioneer. The air pressure purchased by each market agent is then distributed to the actuators mapped thereto.

20 Claims, 8 Drawing Sheets

OTHER PUBLICATIONS

Carl A. Waldspurger, Tad Hogg, Bernardo A. Huberman, Jeffrey O. Kephart, and Scott Stornetta, "Spawn: A Distributed Computational Economy" IEEE Trans. On Software Engineering, vol. 18, No. 2, pp. 103–117, Feb. 1992.

Michael P. Wellmand, "A Computational Market Model For Distributed Configuration Design, " in "Readings in Agents," Edited by Huhns et al., Morgan Kaufmann Publishers, Inc., 1997.

"*MEMS Based Active Stabilization Of Structures,*" available on the Web at http://www.parc.xerox.com/spl/projects/MEMS/structural–enhance.html, Jan. 13, 1997.

MARKET-BASED CONTROL SYSTEM FOR CONTROLLING OBJECT MOTION WITH SMART MATTER

CROSS-REFERENCE TO RELATED APPLICATIONS

Cross-reference is made to the following U.S. patent applications, each of which is assigned to the same assignee as the present invention and hereby incorporated by reference: Ser. No. 09/033,792, entitled "Multi-Hierarchical Control System For Controlling Object Motion With Smart Matter" (now U.S. Pat. No. 6,039,316); Ser. No. 09/033,389, entitled "Adaptive Multiagent Control System For Controlling Object Motion With Smart Matter" (now U.S. Pat. No. 6,027,112); and Ser. No. 09/033,222, entitled "Distributed Control System With Global Constraints For Controlling Object Motion With Smart Matter".

BACKGROUND OF THE INVENTION

1. Field of the Invention

The present invention relates generally to a method and apparatus for controlling microelectromechanical systems (MEMS), and more particularly, to a market based control system for controlling movement of an object on a transport assembly.

2. Description of Related Art

Smart matter is defined herein as a physical system or material with arrays of microelectromechanical devices embedded therein for detecting and adjusting to changes in their environment. For example, smart matter can be used to move sheets of paper in a printing machine or maneuver an aircraft by performing tiny adjustments to wing surfaces. Generally, each microelectromechanical device embedded in smart matter contains microscopic sensors, actuators, and controllers. A characteristic of smart matter is that the physical system consists large numbers (possibly thousands) of microelectromechanical devices. These devices work together to deliver a desired higher level function (e.g., moving a piece of paper from one location to another, or flying a plane).

Programs for controlling smart matter do not always adequately achieve the desired higher level function of issuing command to compensate for detected changes in a physical system because of the significant number of devices that operate in parallel to control it. That is, there exists a number of factors which make the computational task of a control program for smart matter difficult. One factor which may be cause control programs to be computationally intense is caused by the high redundancy of sensors and actuators in the physical material. In order for smart matter systems to exhibit the enhanced reliability and robustness over conventional systems, smart matter systems contain many more devices than necessary to achieve a desired performance. Failure or improper function of some elements, even a significant fraction, is compensated by the actions of the redundant components. Moreover, the ability of smart matter systems to tolerate component failure can be used beneficially to lower the fabrication cost of the components.

One approach for controlling smart matter is to rely on a single global processor coupled with rapid access to the full state of the system and detailed knowledge of system behavior. This method, however, is generally ineffective because of the large number of devices embedded in smart matter. Another approach for controlling smart matter is through the use of a collection of autonomous computational agents (or elements) that use sensor information to determine appropriate actuator forces. Using multiple computational agents to provide distributed control instead of centralized control may prove more effective because each computational agent is only concerned with limited aspects of the overall control problem. In some multi-agent systems, individual agents are associated with a specific sensor or actuator embedded in the physical system. This method for controlling smart matter defines a community of computational agents which, in their interactions, strategies, and competition for resources, resembles natural ecosystems. Furthermore, by distributing control among computational agents, the system as a whole is better able to adapt to environmental changes or disturbances because the system can compensate for new circumstances by simply changing the relationship of the agents.

Although multi-agent systems have been used to solve distributed control problems, they have been limited to systems which are physically large or geographically scattered. For example, multi-agent systems have been used in distributed traffic control, flexible manufacturing, robotic system design, and self-assembly structures. Using multi-agent systems to control smart matter is different from these known multi-agent systems because of the tight coupling between computational agents and their embedded physical space. Furthermore, controlling smart matter using traditional multi-agent systems is difficult because of mechanical interactions that decrease in strength with the physical distance between them. This makes the computational problem difficult because interactions between computational agents cannot be ignored.

There exists, therefore, a need to provide a multi-agent system for controlling smart matter that solves these as well as other control problems. It would, therefore, be desirable to provide a distributed control system for smart matter that is able to adapt to physical systems which have differing specifications because of exceeding manufacturing tolerances or because of material defects. In addition, it would be desirable to provide a controller for smart matter that robustly coordinates a physically distributed real-time response with many devices in the face of failures, delays, changing environmental conditions, and incomplete models of system behavior.

SUMMARY OF THE INVENTION

In accordance with the invention there is provided a transport assembly, and method therefor, for moving an object. The transport assembly includes a system resource such as an air pressure source. Actuator units use quantities of the system resource to move the object on the transport assembly. Sensor units provide positional information of the object on the transport assembly. A control system controls motion of the object on the transport by allocating quantities of the system resource to selected ones of the actuator units. The control system includes market agents, an actuator distributor and a market auctioneer. The market agents compute bids to purchase quantities of the system resource for the actuator units. The actuator distributor specifies available quantities of the system resource for consumption by the actuator units. The market auctioneer, which is coupled to the market agents and the actuator distributor, receives the bids computed by the market agents and the available quantities of the system resource specified by the actuator distributor to compute an allocation of the system resource that satisfies an aggregation of the bids.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

A. Transport Assembly

Figure 1:
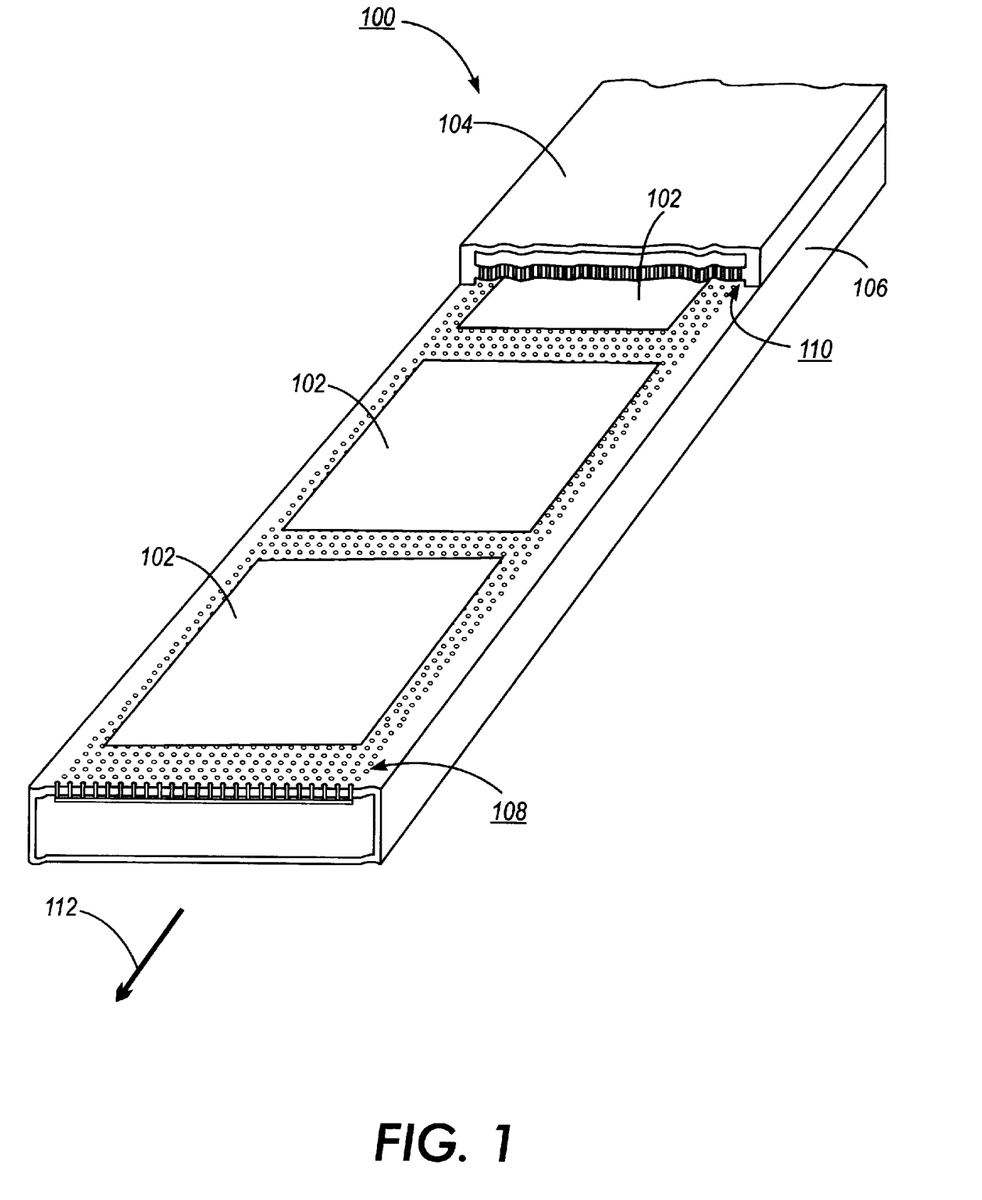
FIG. 1 illustrates a smart matter transport assembly for carrying out the present invention.

Referring now to the drawings where the showings are for the purpose of describing the invention and not for limiting same, FIG. 1 illustrates a transport assembly 100. The transport assembly 100, which is used to transport objects 102 in the process direction 112, is divided up into an upper section 104 and a lower section 106. For illustrative purposes part of the upper section 104 is cut away. Advantageously, the transport assembly 100 can transport a number of different types of materials such as paper, plastics, glass, foils, fabrics, uncured rubber and wafers. The sections 104 and 106 are sufficiently spaced apart to define a spacing 110 in which the object can travel along the transport assembly without contacting either the upper or lower sections 104 and 106. Embedded in both the upper and lower sections 104 and 106 are arrays of spatially fixed microelectromechanical devices 108 (MEMS) that dynamically support, move, and guide the objects 102 through the transport assembly 100. It will be understood by those skilled in the art that depending on the size, weight and flexibility of the object being transported and the speed and accuracy in which the object is required to be transported, the transport assembly may consist of only one of the upper section 104 or the lower section 106.

Figure 2:
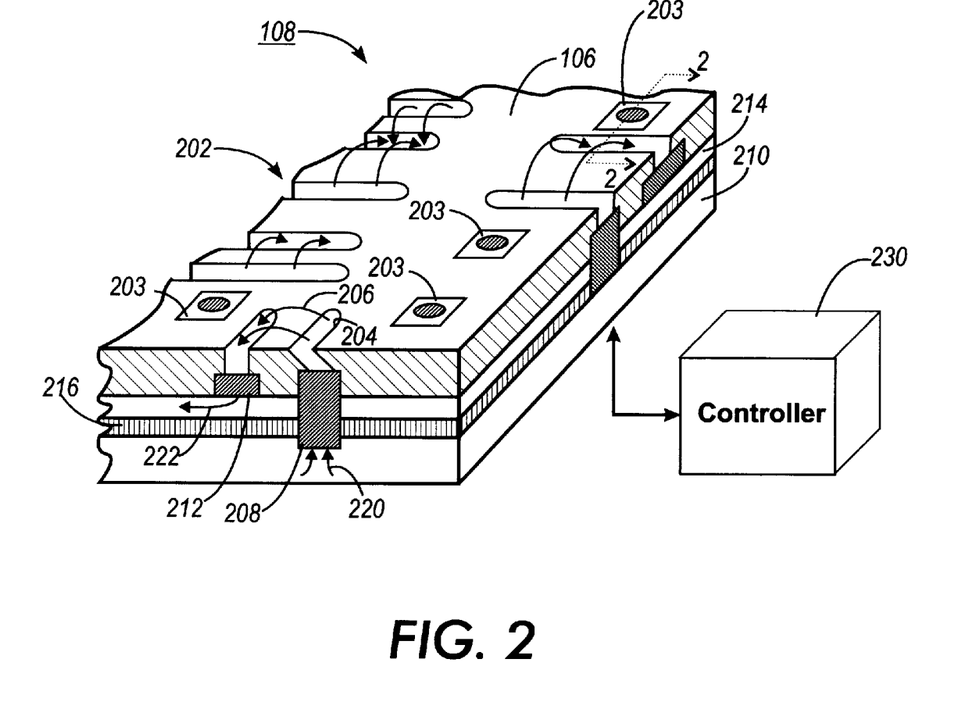
FIG. 2 illustrates a portion of the lower section of the transport assembly shown FIG. 1.

FIG. 2 illustrates a portion of the lower section 106 of the transport assembly 100 shown in FIG. 1. More specifically, FIG. 2 illustrates a number of microelectromechanical devices 108 that consist of combinations of actuators 202, sensors 203, and controller(s) 230. In one embodiment, the actuators, sensors, and controller are fabricated together on a single silicon wafer. In another embodiment shown in FIG. 2, the sensors and actuators are fabricated in a housing separate from the controller 230. In the embodiment shown in FIG. 2, the actuators 202 are air jet actuators that include two or more channels 204. In another embodiment not shown the actuators 202 engage a mechanical drive coupled to rollers for transporting flexible objects such as paper.

More specifically in FIG. 2, the arrows indicated by reference number 206 illustrate the general movement of air exiting and entering the air jet channels 204. At least one of the channels of an air jet allows the exit of flowing air and the other of the channels the entrance of flowing air. It will be appreciated by those skilled in the art, however, that the air jet actuators may consist of a single channel which allows only the exit of air. A low-pressure plenum 214 is separated from high-pressure plenum 210 by a partition 216. The difference in pressure between low-pressure plenum 214 and high-pressure plenum 210 permits air to flow from one channel to another. For example, a valve 208 can be selectively operated to permit high-pressure air in plenum 210 to flow upward at an angle as indicated by arrows 220, to impart momentum to objects 102 on the transport assembly, and pass downward through valve 212 into plenum 214 as indicated by arrows 222.

Figure 3:
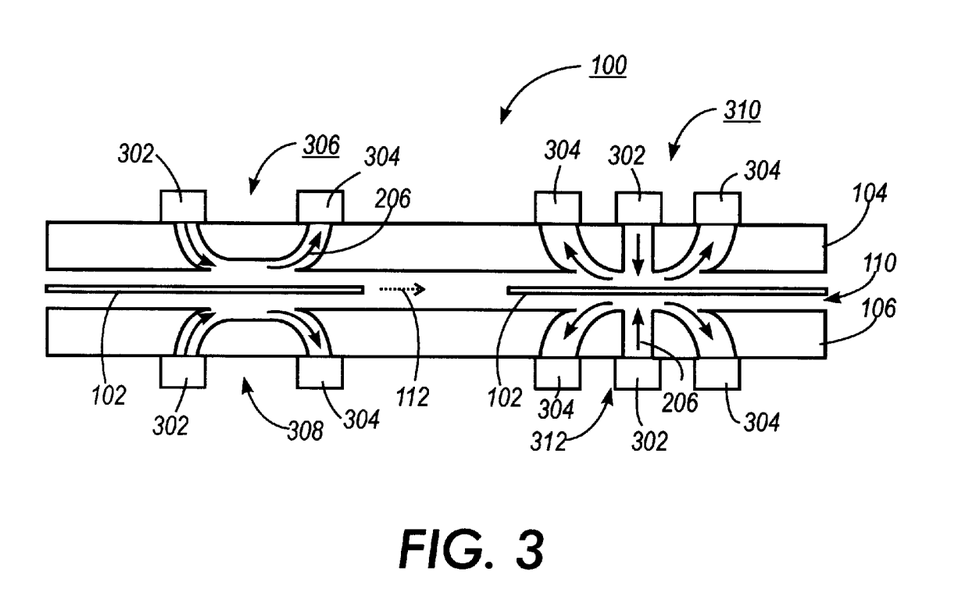
FIG. 3 illustrates two different types of air jets that are embedded in the transport assembly shown in FIG. 1.

FIG. 3 illustrates examples of two different types of air jet actuators 202 that are embedded in transport assembly shown in FIG. 1. As set forth above, the transport assembly 100 is divided into upper and lower sections 104 and 106 with the spacing or passageway 110 therebetween. A first type of air jet is indicated by reference numbers 306 and 308 and a second type of air jet by reference numbers 310 and 312. The two types of air jet actuators have valves 302 for releasing air from high-pressure plenum 212 and valves 304 receiving air into low-pressure plenum 214. The flow of air in FIG. 3 is indicated generally by arrows 206. Depending on the direction in which the air jet actuators 306 and 308 are positioned, air released therefrom will urge the object 102 in a selected process direction 112 and speed by adjusting the amount of air released onto either side of the object 102. In contrast, the air jet actuators 310 and 312 can be used to support the object 102 by applying an opposing vertically directed air flow as indicted by arrows from valves 302.

It will be appreciated by those skilled in the art that the first type of air jet actuators 306 and 308 may be positioned so that they exert a force opposite to that shown in the Figures in order to impart momentum to stop the object from moving in the process direction 112. In addition, it will be appreciated by those skilled in the art that two sets of the first type of air jet actuators 306 and 308 may be oriented to apply forces to rotate the object. For example, the object may be rotated by having a first set of air jet actuator, located on one side of the object, push in the process direction, while having a second set of air jet actuator, located on the other side of the object, push in a direction opposite to the process direction so that the combined effect of the two air jet actuators is to apply a torque to the object.

Figure 4:
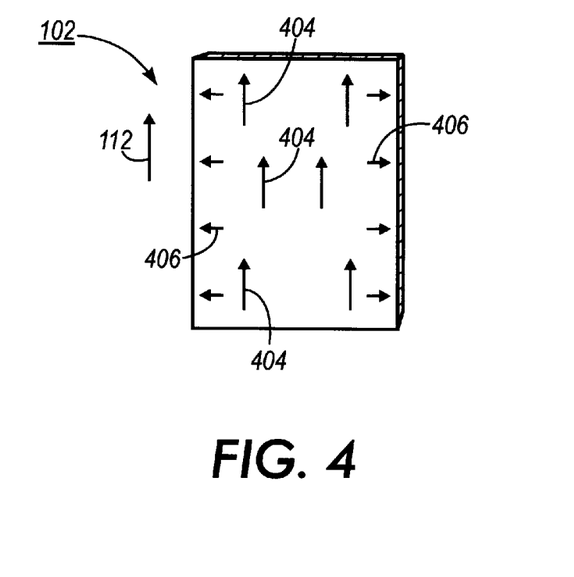
FIG. 4 illustrates one manner in which directional forces from air jets are applied to the object to control its movement along the transport assembly.

FIG. 4 illustrates one manner in which directional forces from air jet actuators 202 are applied to the object 102 to control its movement along transport assembly 100 in the process direction 112. Longitudinal forces, indicated by arrows 404, are applied to cause the object to move in the process direction 112. Lateral forces, indicated by arrows 406, are applied perpendicular to the direction of motion to stabilize the object 102. Vertical forces, not shown, help maintain the object 102 between the upper and lower sections 104 and 106 of the transport assembly 100. In FIG. 4, the relative strength of the forces 404 and 406 applied to the object 102 are illustrated by the length of the arrows 404 and 406. It will be appreciated by those skilled in the art that the accelerations resulting from these vertical, lateral, and longitudinal forces applied to an object will vary depending on the type of material and size of the object. Thus, for example, paper which is lighter and more flexible than glass may require smaller longitudinal forces but greater lateral forces to stabilize it on transport assembly 100 than a more rigid object such as glass.

Figure 5:
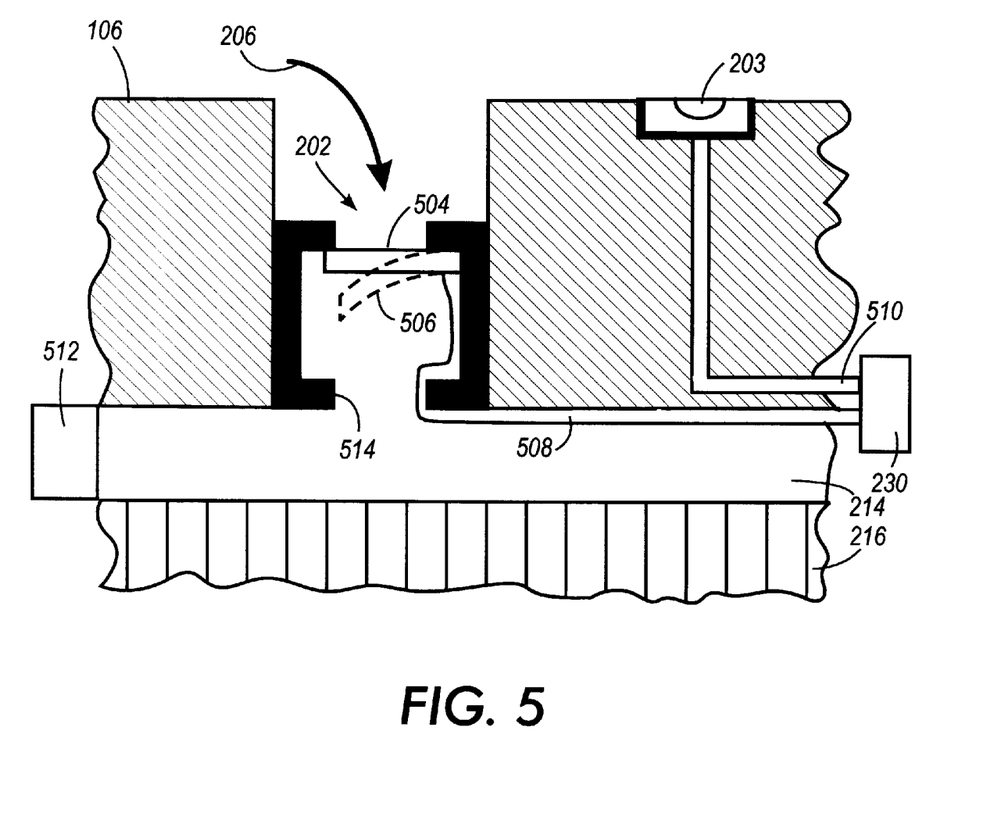
FIG. 5 illustrates a side view of an air jet, a sensor, and a controller as seen along view line 2—2 in FIG. 2.

FIG. 5 illustrates a side view of an air jet 202, sensor 203, and controller 230 as seen along view line 2—2 in FIG. 2. In the embodiment shown in FIG. 5, the air jet 202 is a piezoelectric flap valve. The flap valve is electrically controlled through lead 508 by controller 230 to be either in a closed position, indicated by reference number 504 (solid lines), or an open position, indicated by reference number 506 (dotted lines). The air jet 202 includes a housing 514 positioned in an aperture of the surface of lower section 106. In FIG. 5 the air moves inward because it is coupled to low-pressure plenum 214 as indicated by arrow 206. The pressure in the plenum is maintained by air pressure source 512. Sensor information from sensor 203 is received through lead 510 by controller 230. The sensor 203 in one embodiment is an optical sensor that is sufficiently accurate and quick to detect the object 102. In other embodiments, the sensor 203 is another type of contactless sensor such as a pressure sensor, acoustic sensor, or electrostatic sensor.

B. Markets-Based Controller

Figure 6:
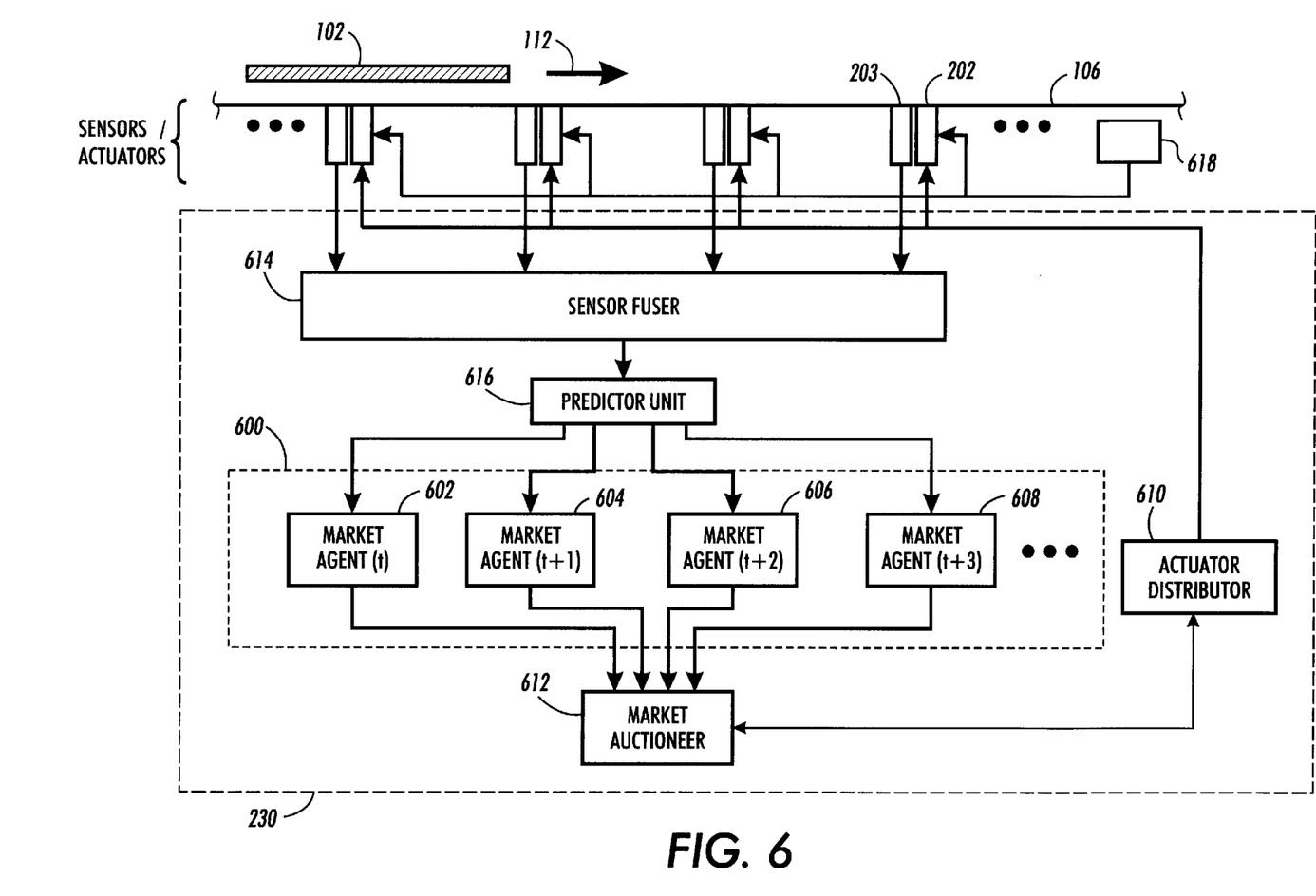
FIG. 6 illustrates an instance of a computation market in which producers and consumers have agents associated with points in time as well as points in space.

FIG. 6 illustrates a detailed block diagram of a market based control system for controlling movement of an object with the transport assembly 100. In accordance with the invention, control is distributed between a plurality of market agents which are indicated generally in FIG. 6 by reference number 600. The plurality of market agents 600 are computational elements that provide robust control in the event the transport assembly receives incomplete information about local changes. Incomplete information may result either because some sensors and actuators are defective or because the transport assembly deviates from nominal specifications. Deviations from a system's nominal specifications may, for example, occur when manufacturing tolerance levels are exceeded. In addition, the market based computational agents 600, advantageously, coordinates asynchronous operation of the transport assembly in which knowledge of the transport assembly's behavior as a whole is imperfect.

The market based control system 230, which is used to control the transport assembly, optimizes different control forces that influence the detailed motion of an object with a market auctioneer 612. By mediating between goals of the market agents 600 and the actuator distributor 610, the market auctioneer 612 enables precise control of the motion of each object on the transport assembly. Unlike other distributed control systems for maintaining precise control of an object, the market based control system 230 provides a flexible mechanism for allocating system resources 618 among multiple distributed agents. Advantageously, the distributed market based control system 230 requires little information to be transmitted between agents because a single price is used to summarize the current demand for a system resource 618. In effect, this market mechanism coordinates asynchronous operations for precisely controlling the motion of different objects on the transport assembly.

In the control system 230, mappings between agents 600 and locations on the transport assembly are dynamic. These mappings associate market agents with both points in space and points in time. Market agents are mapped to points in space or regions of localized control, as an object moves along the transport assembly. Mappings between market agents 600 and the sensors and actuators may change depending on the location of objects on the transport assembly. The number of market agents 600 allocated in the controller 230 depends on the size of the localized regions of control and the number of objects on the transport assembly. Each localized control region may consist of one or more sensors 203 and actuators 202. The market agents 600 mapped to a particular set of sensors and actuators may have complete or dominant control over those system elements. The mapped regions of localized control vary in size by varying the number of sensors and actuators in the particular set. In one embodiment, localized regions of control are enlarged using hierarchical organizations. In another embodiment, the mapped regions may overlap to provide smooth transitions between the regions of control. These overlapping regions of control can be defined using multihierarchical organizations of market agents.

In addition to mapping market agents to points in space (e.g., physical regions of the transport assembly), market agents 600 may also be mapped to points in time. As illustrated in FIG. 6, each market agent 600 is mapped to a point in time relative to some reference time such as a system clock. More specifically, market agents 602, 604, 606, and 608 are mapped to points in time (t), (t+1), (t+2), and (t+3). It will be appreciated by those skilled in the art that the time interval $\Delta t$ between market agents mapped to points in time need not be uniform (e.g., (t), (t+4), (t+5), and (t+10)). It will also be appreciated that the duration of the time interval $\Delta t$ between market agents, whether uniform or non-uniform, depends on the physical distance between the market agents. In addition, the duration of the time interval $\Delta t$ depends on the size of the object or the average rate a which the object travels.

By mapping each agent 600 to a unique point in time, market agents are able to anticipate system changes. That is, mapping agents to points of time in the future permits the controller 230 to anticipate future demands for system resources 618. As a result, a desired trajectory of the object is more likely to be achieved since the response to adjustments to actuator units such as air valves are not instantaneous. In one instance, the desired trajectory defines how the object moves on the transport assembly as a function of time. For example, mapping market agents to future points in time allows the system to anticipate the time that it takes to accelerate the object to a desired velocity. Furthermore, market agents mapped to future points in time allows the system to take into account effects caused by the physical coupling of actuators. The effects from physical coupling are caused either by neighboring air jets blowing on the same object or by neighboring air jets with output streams that interfere with each other.

Referring again to the controller shown in FIG. 6, a sensor fuser 614 accumulates input from sensors 203 over a clocked interval. In operation, the sensor fuser 614 processes the sensor input into a format that is used to evaluate the location and speed of objects on the transport assembly. Depending on the particular mappings of market agents 600 to sensors and actuators, the sensor data may or may not be processed by the sensor fuser 614. The particular sensor information transmitted to the particular market agent defines a mapping between sensor units and the market agents. The mapping between sensors 203 and market agents 600 can be either a one-to-one mapping or a one-to-many mapping. In one embodiment, sensor data from the sensor fuser 614 is transmitted directly through predictor unit 616 to selected ones of the market agents 600. In another embodiment, output from the sensor fuser 614 is evaluated by the predictor unit 616 to provide the market agents with extrapolated sensor data. In this other embodiment, the predictor unit delivers to selected market agents extrapolated sensor data that corresponds to points in time to which the market agents are mapped. Sensor data, which is extrapolated, is used to predict the location of an object on the transport at some future point in time.

Figure 7:
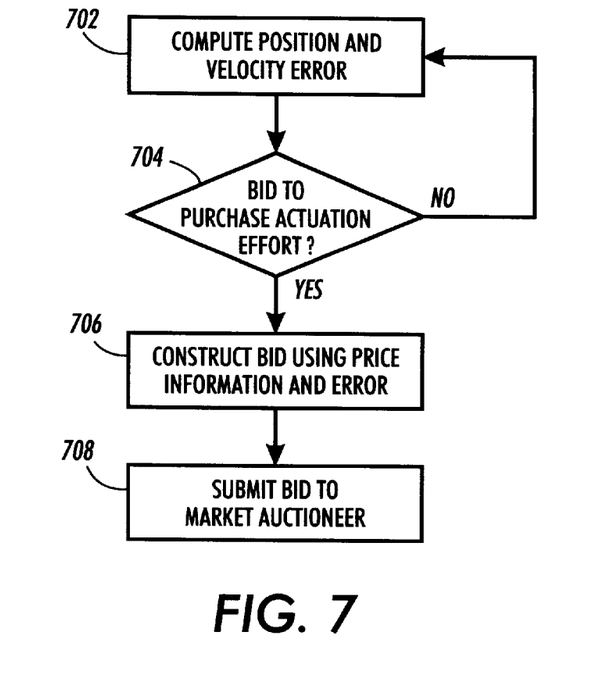
FIG. 7 is a flow diagram of the steps performed by each market agent after receiving sensor data from the predictor unit.

FIG. 7 is a flow diagram which sets forth the steps performed by each market agent 600 after receiving sensor data from the predictor unit 616. It will be appreciated by those skilled in the art that the rate at which sensor data is received from the predictor unit can vary depending on any number of factors which include the computational speed of the system, the desired trajectory of the object, and the rate at which sensor information is gathered. At step 702, each market agent computes a weighted error "s" which is given by the following equation:

$$"s" = w_x \frac{\Delta x}{x_{desired}} + w_v \frac{\Delta v}{v_{desired}}, \text{ where}$$

$\Delta x$ is the positional error of the object given by ($x_{actual} - x_{desired}$), where $x_{actual}$ is the position of the object at time $t+\Delta t$ predicted using the known position and velocity of the object at time t;

$\Delta v$ is the velocity error of the object given by ($v_{actual} - v_{desired}$);

$x_{desired}$ is the desired position and $v_{desired}$ is the desired velocity of the object at time $t+\Delta t$ defined using a predefined trajectory of the object (i.e., system goal); and $w_x$ and $w_v$ are weight factors for position and velocity, respectively.

The magnitude of the weighted error "s" is used by each agent to estimate how close its desired position and velocity is to its actual position and velocity. Since the time interval $\Delta t$ for each agent is different, the magnitude of each weighted error "s" for each agent is unique. Also, the magnitude of the weighted error "s" varies depending on the values of the weight factors $w_x$ and $w_v$. The values of these weight factors vary depending on whether the system goal is better accomplished by achieving a desired velocity or a desired position.

At step 704, each market agent determines, with a utility function, whether to submit a bid to acquire a percentage of a system resource 618. In market based control system 230, actuators 202, or the corresponding air valves, are identified as consumers and the pressure source(s) feeding low and high-pressure plenums as the producer of a replenishing system resource 618. It will be appreciated that the system resource need not be limited to one producer and can be supplied by a plurality producers (e.g., pressure sources or power supplies). It will also be appreciated that the resource could be non-replenishing. In negotiating a market price the consumers are represented by market agents 600, and the producer(s) is represented by actuator distributor 610. Initially, all market agents start with a specified amount of currency. In one embodiment, the profits that the actuator distributor receives from selling the system resource 618 are redistributed equally among the market agents 600. This funding policy implies that the total amount of currency in this market mechanism remains constant over time. In an alternate embodiment, profits are redistributed unequally to the market agents. In this alternate embodiment, those market agents mapped to critical elements of the system are redistributed more profits than other market agents mapped to less critical elements. Generally, critical elements are elements of the system that are critical to successfully achieving the object's desired trajectory (e.g., an element that is prone to errors).

The utility function used to submit a bid at step 704 quantifies the tradeoffs between using quantities of the system resource 618 and the loss of wealth involved if the transaction is performed. In one embodiment, the system resource 618 is air delivered from pressure source 512 shown in FIG. 5. In another embodiment, the system resource 618 is power delivered to each actuator unit. The following utility function is an example of a utility function "U" that can be used to determine how a market agent should bid for the available quantities of system resource 618:

$$\text{if } s > 0: \begin{cases} U_{slow} = 1 \\ U_{fast} = 0, \end{cases} \text{ and}$$

$$\text{if } s < 0: \begin{cases} U_{slow} = 0 \\ U_{fast} = 1. \end{cases}$$

Using the utility function above, if the weighted error "s" does not equal zero then the market agent constructs a bid at step 706; otherwise, step 702 is repeated. Generally, price information and calculated error are taken into account when constructing a bid. In the simple utility function above, if the error "s" is greater than zero then the object should be going slower. To slow down the object, the market agent submits a bid to minimize the air released by the actuator. However, if the weighted error is less than zero, then the object should be going faster. To speed up the object, the market agent submits a bid to maximize the air release by the actuator. In an alternative embodiment, the utility function is defined more generally as follows:

$$U_{general} = (w_{external})(w_{price})(s), \text{ where}$$

$w_{external}$ equals a weight that identifies external factors such as, agent's wealth, time, state or capabilities of system, position of object; and $w_{price}$ equals a weight that is proportional to 1/price.

The general utility function, $U_{general}$, takes into account the external factors, price and error, when constructing a bid. In addition, the general utility function can be modified to consider the error from other agents. Also, with the general utility function, the price information may include both current and prior pricing information. Unlike the less general utility function U, the more general utility function takes into account additional preferences and constraints in deciding a value for a bid.

Finally at step 708, the bid for the market agent is submitted to the market auctioneer 612. It will be appreciated by those skilled in the art that the market auctioneer 612 may include two or more auctioneers if two or more system resources are being bid for by the market agents. In submitting its bid, each market agent can submit either a single bid (e.g., quantity$_1$ at price$_1$) or a collection of bids (e.g., quantity$_1$ at price$_1$, quantity$_2$ at price$_2$, quantity$_3$ at price$_3$, etc.). When collections of bids are submitted to the market auctioneer by a market agent, they are represented using a demand curve. These demand curves of the market agents 600 are independently weighed in order to adjust control of localized regions of the transport assembly. By weighing demand curves of individual agents, priority of scarce system resources can be allocated to selected regions of the transport assembly.

Figure 8:
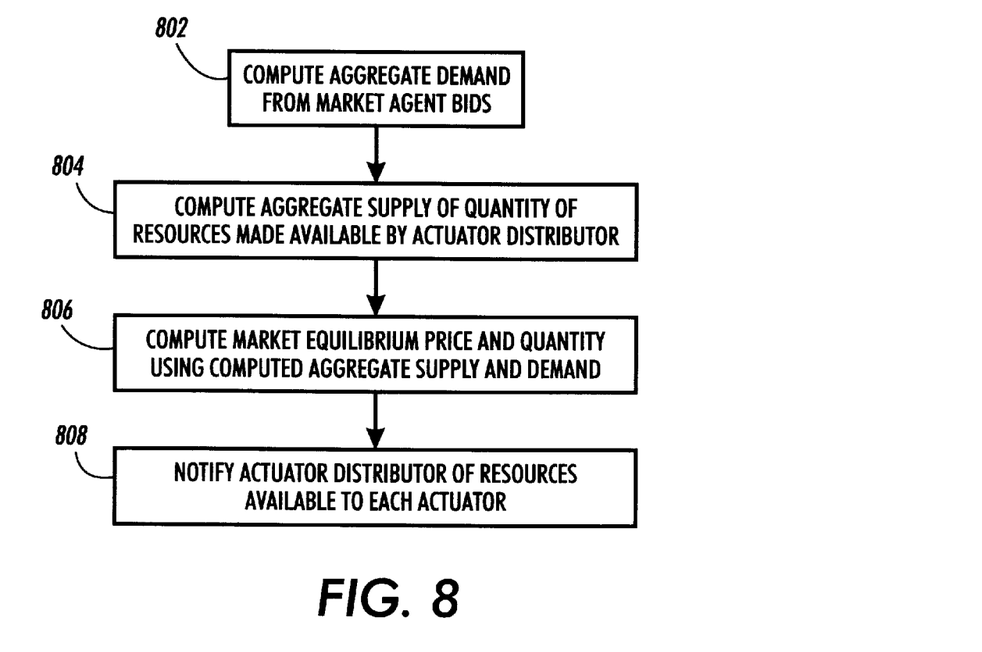
FIG. 8 is a flow diagram of the steps performed by the market auctioneer once bids are received by from market agents.

FIG. 8 is a flow diagram of the steps performed by the market auctioneer 612 once bids or individual demand curves are received from market agents 600. It will be appreciated, however, by those skilled in the art that the market auctioneer 612 may have to iterate bids with the market agents 600 if only a single bid (i.e., a single price and quantity) is submitted instead of an individual demand curve (i.e., range of different prices and quantities). At step 802, an aggregate demand curve for the bids submitted by the market agents is computed. Subsequently, at step 804, an aggregate supply curve is computed from quantities of resources made available at different prices by actuator distributor 610. That is, at step 804, the actuator distributor provides a list of different prices and quantities at which the system resource 618 is available. At step 806, a market equilibrium price and quantity are computed using the computed supply and aggregate demand curves. In this way the market auctioneer 612 mediates between goals of the market agents 600 and the actuator distributor 610. It is generally known that an equilibrium price and quantity are found where the aggregate demand curve and aggregate supply curve intersect. Finally at step 808, the market auctioneer 612 notifies the actuator distributor 610 of the quantities of the system resource 618 available to each actuator. Subsequently, the actuator distributor 610 adjusts the settings of each actuator to corresponds with those system resources purchased as defined by the market auctioneer 612 at step 806.

C. Active Stabilization of Structures

Figure 9:
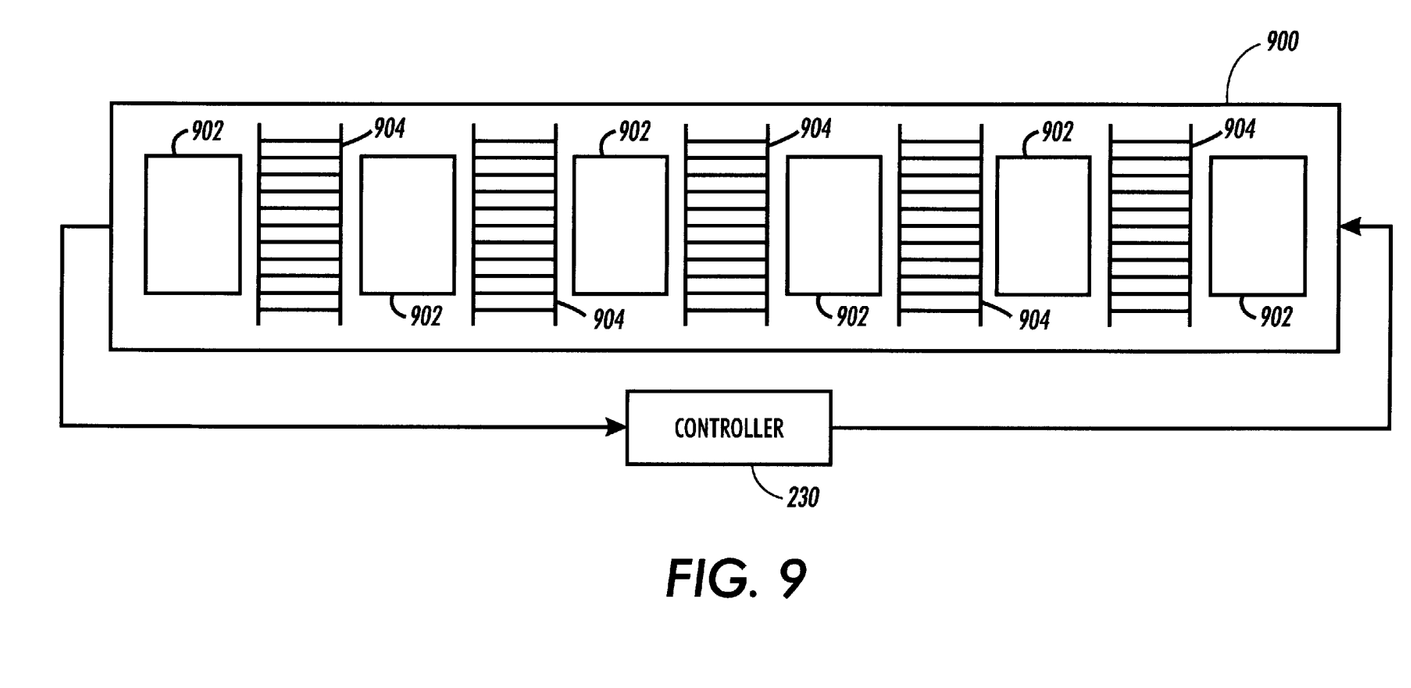
FIG. 9 illustrates an alternate embodiment in which the controller shown in the Figures controls the stability of a beam, as seen from a top-down view.
Figure 10:
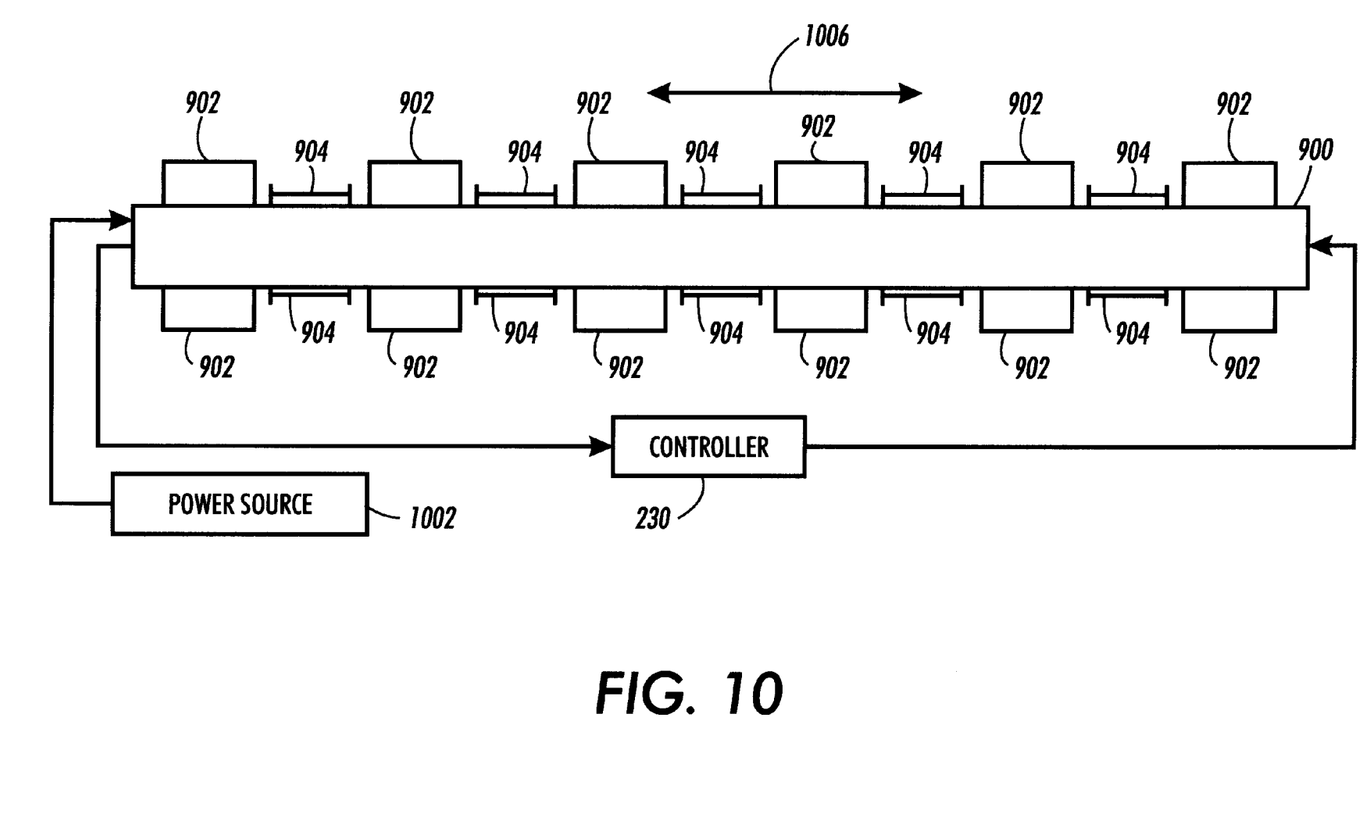
FIG. 10 illustrates a side view of the beam shown in FIG. 9.

FIGS. 9–10 illustrate an alternate embodiment in which the market based control system illustrated in FIG. 6 is used to control a beam 900 which may buckle or become unstable under a load. More specifically, FIG. 9 illustrates a top-down view while FIG. 10 illustrates a side view of the beam 900. Actuators 904, which are interlaced longitudinally between sensors 902 on both sides of the beam 900, exert forces specified by controller 230 to modify the structural behavior of the beam. The controller 230, which is coupled to actuators 904 and sensors 902, consists of market agents that control actuators 904 to stabilize and strengthen the beam 900. The beam is stabilized when linear buckling of the beam is minimized, and strengthened when the buckling load of the beam is increased.

In operation, market agents in the controller 230 determine appropriate forces at which to set patches of piezoceramic actuators 904 from measurements received from strain sensors 902. These market agents use the measurements from the strain sensors 902 to detect structural deformation of the beam. The market agents in controller 230 are mapped to sensors and actuators positioned along the beam. To counterbalance structural deformations, the agents bid on power delivered from power source 1002 for driving the actuator patches 904 to either expand or contract longitudinally as indicated by arrow 1006, thereby creating surface strains on the beam 900.

Figure 11:
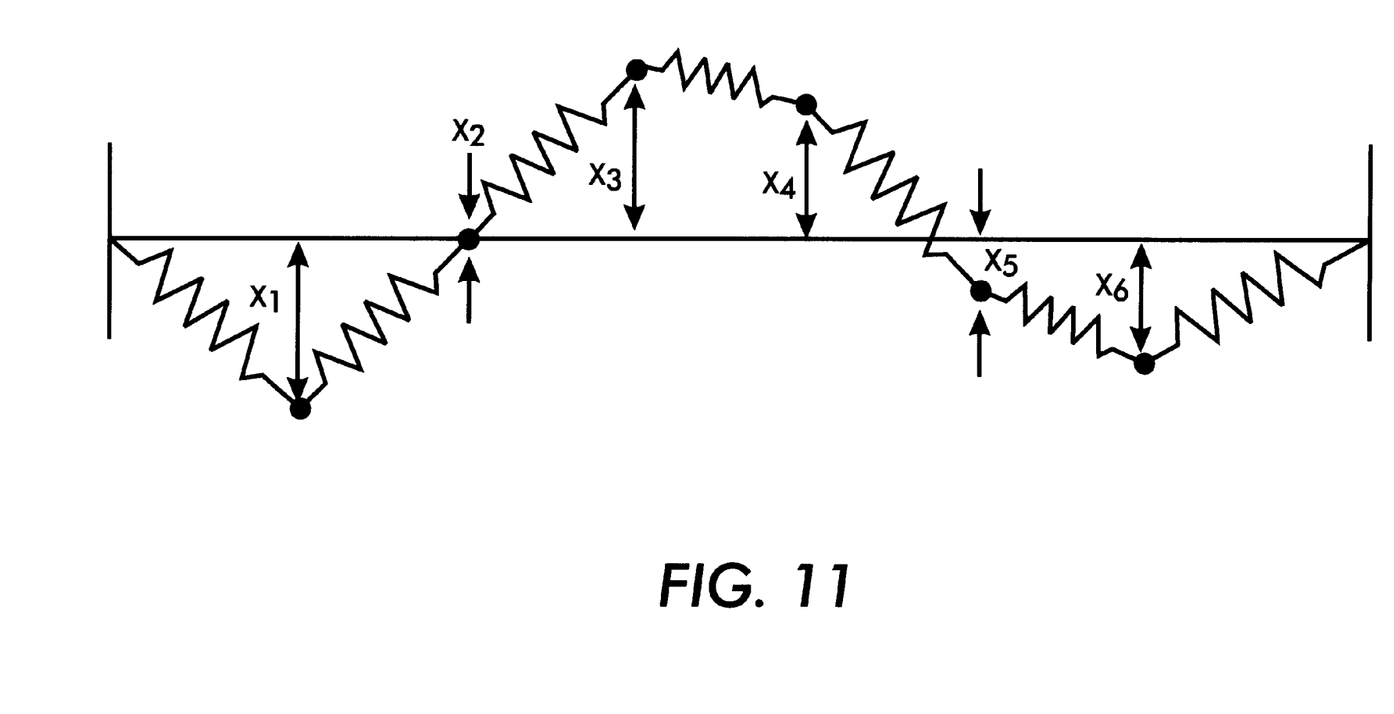
FIG. 11 illustrates the beam shown in FIGS. 9 and 10 modeled using an unstable chain of mass points connected to their neighbors by springs.

In one embodiment, the beam illustrated in FIGS. 9–10 is modeled using an unstable chain of mass points connected to their neighbors by springs, as illustrated in FIG. 11. The chain is inherently unstable because it tends to drive away from its desired configuration. The dynamical behavior of the chain is described using a number of mass points n, a spring constant k, a destabilizing force f, and a damping coefficient g. In such a system, the market agents in the controller 230 bid for a quantity of power for pushing the mass points to maintain the chain in its unstable fixed point position. A market auctioneer in the controller 230 uses the following equation to compute an equilibrium price for trading power:

$$p_{trade} = \sqrt{\frac{b}{na} \sum_{i=1}^{n} |X_i| w_i}, \text{ where}$$

b is a parameter that determines the relative importance to an agent of responding to displacements compared to conserving its wealth for future use;

n is the number of mass points;

a is a parameter that reflects the relative importance of conserving power;

$w_i$ is the agent's wealth; and $$X_i = \sum_{j=1}^{n} a_{ij} x_j, \text{ where}$$

$a_{ij}$ are elements of the interaction matrix "a"; and $x_j$ is the local performance error (or displacement) for agent j.

The equilibrium price $p_{trade}$ is where the demand curve and the supply curve of the traded power P intersect (i.e., $P^{demand}(p)=P^{supply}(p)$). As set forth in the equation for the equilibrium price $p_{trade}$ above, there exists a direct interaction between agents in determining the price of traded power. This direct interaction is in the form of local performance error $x_j$. In computing the equilibrium price $p_{trade}$, the supply of power P for any price p (i.e., supply curve) is given by:

$$P^{supply}(p)=nap,$$

and the demand for power P for any price p (i.e., demand curve) is given by:

$$P^{demand}(p) = \frac{b}{p} \sum |X_i| w_i.$$

The demand curve is found by maximizing the following utility function $U_i$, which reflects a trade off between using power P to act against a displacement x and a loss of wealth w:

$$U_i = -\frac{1}{2w_i} pP^2 + bP|X_i|.$$

More details of the market based controller 230 for controlling an inherently unstable chain is disclosed by Guenther et al., "Power Markets for Controlling Smart Matter," Los Alamos preprint, Archive of Condensed Matter (cond-mat), Publication No. 9703078, Mar. 7, 1997.

D. Summary

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

It will be appreciated that the controller 230 may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

In addition, the controller 230 may either be a physically distributed system in which each market agent is operating on a separate processing unit. Alternatively, the controller may be implemented in a memory of a centralized processing unit having one or more processors. Because each market agent does not have to be cognizant of whether it is operating on a physically distributed or centralized system, the software for implementing the controller can be implemented to run in either environment. It will also be appreciated by those skilled in the art that although a central market mechanism used to was presented, other market mechanisms such as decentralized bilateral trades, decentralized auction, or arbitrage can be used to determine an equilibrium price and quantity of a system resource.

It will be appreciated by those skilled in the art that actuators 202 can be used to move an object along the transport assembly with fluids other than air. Also, it will also be appreciated by those skilled in the art that the controller 230 can be used to control other types of pneumatic actuators such as vacuum actuators. In addition, it will be appreciated that the controller can be used to control mechanical actuators. For example, controller 230 can be used to control mechanical rollers or a vacuum belt to move sheets of paper in an electronic printing machine. In another embodiment, not shown, the sensor fuser is coupled to sensor units that are physically offset from actuator units on the transport assembly. In this alternate embodiment, the sensor fuser is coupled to sensor units and actuator units which are not co-located immediately adjacent to each other.

A more detailed description of the sensors and actuators forming a transport assembly is disclosed in U.S. Pat. No. 5,634,636, which is incorporated herein by reference. For additional details, examples and background on smart matter, the following articles are incorporated herein by reference: Guenther et al., "Controls for Unstable Structures," published in SPIE Proceedings Vol. 3039, pp.754–763, June 1997 (ISBN: 0-8194-2452-8) and presented at Proc. of the SPIE conference on Mathematics and Control in Smart Structures Mar. 3–6, 1997; and Guenther et al., "market organizations for controlling smart matter," published in "simulating social phenomena," editor Conte et al., pp. 241–257, September, 1997.

What is claimed is:

1. A transport assembly for moving an object, comprising:
    a system resource;
    actuator units for moving the object on the transport assembly with said system resource;
    sensor units for providing positional information of the object on the transport assembly; and
    a control system for controlling motion of the object on the transport by allocating quantities of said system resource to selected ones of said actuator units; said control system further comprising:
    market agents for computing bids for said actuator units to purchase quantities of said system resource;
    an actuator distributor for specifying available quantities of said system resource for consumption by said actuator units; and
    a market auctioneer, coupled to said market agents and said actuator distributor, for receiving the bids computed by said market agents and the available quantities of said system resource specified by said actuator distributor; said market auctioneer computing an allocation of said system resource that satisfies an aggregation of the bids.

2. The transport assembly according to claim 1, wherein said control system further comprises a predictor unit for predicting, with the positional information provided by said sensor units, locations of the object on the transport assembly at different points in time.

3. The transport assembly according to claim 1, wherein said control system maps said market agents to regions of the transport assembly having sensor and actuator units.

4. The transport assembly according to claim 1, wherein said control system dynamically maps said market agents to points in time relative to a system time.

5. The transport assembly according to claim 1, wherein said actuator distributor specifies a quantity and a price at which said system resource is available.

6. The transport assembly according to claim 1, wherein said actuator distributor specifies a range of quantities and prices at which said system resource is available.

7. The transport assembly according to claim 1, wherein said control system further comprises a predictor unit coupled said market agents for extrapolating a location of the object at time (t+1) from a known position at time (t).

8. The transport assembly according to claim 1, wherein each bid computed by said market agents is represented with a demand curve.

9. The transport assembly according to claim 1, wherein bids of each market agent are weighted to adjust control of localized regions of the transport assembly.

10. The transport assembly according to claim 1, wherein said system resource is an air pressure source.

11. The transport assembly according to claim 1, wherein said actuator units are air valves.

12. The transport assembly according to claim 1, wherein said sensor units are optical sensors.

13. The transport assembly according to claim 1, wherein said market auctioneer computes an equilibrium allocation of said system resources that satisfies an aggregation of the bids.

14. The transport assembly according to claim 1, wherein said system resource is a replenishing resource.

15. A method for controlling motion of an object with a transport assembly having embedded sensor units and actuator units, comprising the steps of:
    specifying, with an actuator distributor, prices at which quantities of a system resource are available for consumption by the actuator units;
    allocating market agents to compute bids to purchase certain quantities of the system resource; and
    computing, with a market auctioneer, an allocation of the system resource that satisfies an aggregation of the bids.

16. The method according to claim 15, further comprising the step of predicting, with positional information provided by the sensor units, locations of the object on the transport assembly at different instances in time.

17. The method according to claim 15, further comprising the step of mapping the market agents to points in time relative to a system time.

18. The method according to claim 15, further comprising the step of mapping the market agents to points in space relative to the transport assembly.

19. The method according to claim 15, further comprising the step of independently weighing bids of each market agent to adjust control of localized regions of the transport assembly.

20. A control system for controlling an object having a position on a transport assembly; the transport assembly having arranged therein arrays of coupled sensor units and actuator units; the sensor units providing positional information of the object on the transport assembly; the actuator units consuming quantities of a system resource, said control system comprising:

an actuator distributor for specifying the quantities of the system resource available for consumption by the actuator units; said actuator distributor determining a price at which the quantities of the system resource are available;

market agents for computing bids to purchase quantities of the system resource with respect to a position mapping and a time mapping; the position mapping associating the market agents with a region of the transport assembly having selected ones of the sensor units and the actuator units; the time mapping associating the market agents with a point in time relative to a system time of the transport assembly; and a market auctioneer, coupled to said market agents and said actuator distributor, for receiving the bids computed by said market agents and the available quantities and prices of the system resource specified by said actuator distributor; said market auctioneer computing an allocation of the system resource that satisfies the bids.

* * * * *